July 31, 1934.   E. O. HANSON   1,968,683
REAPER
Filed Jan. 19, 1928   2 Sheets-Sheet 2
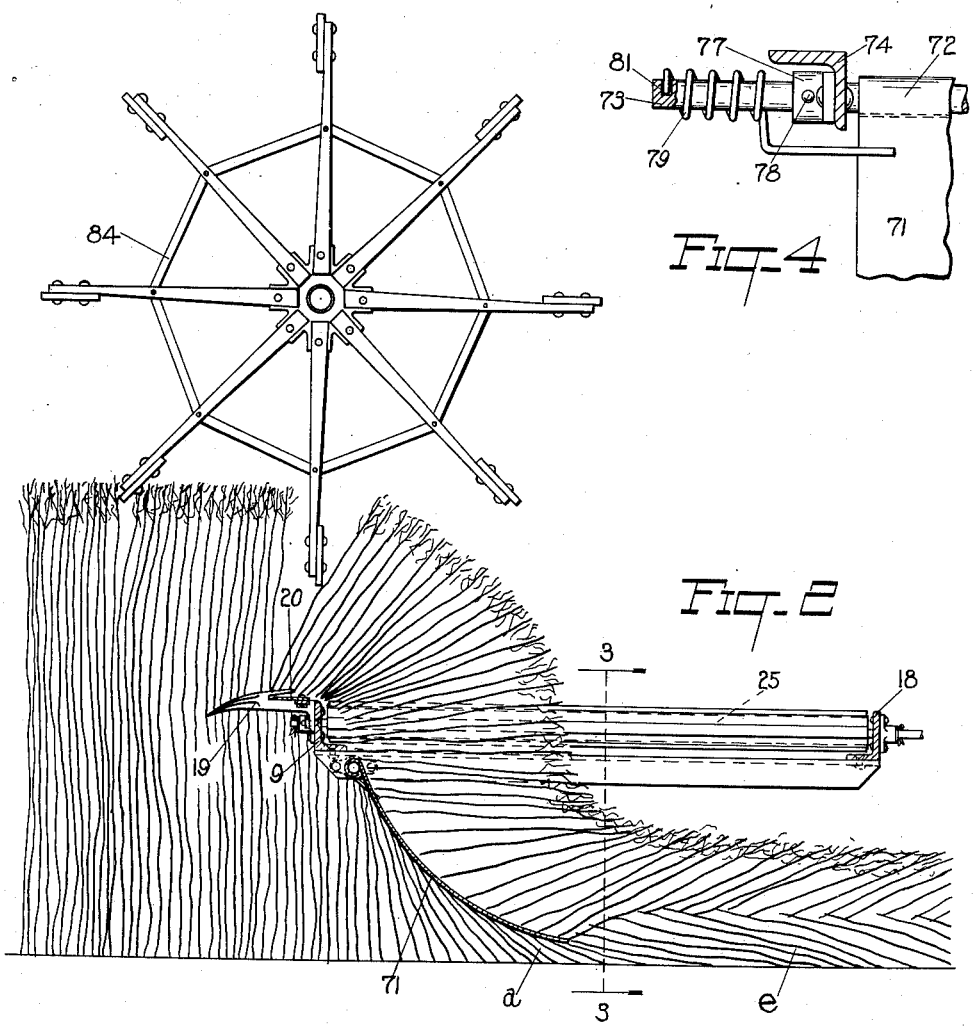
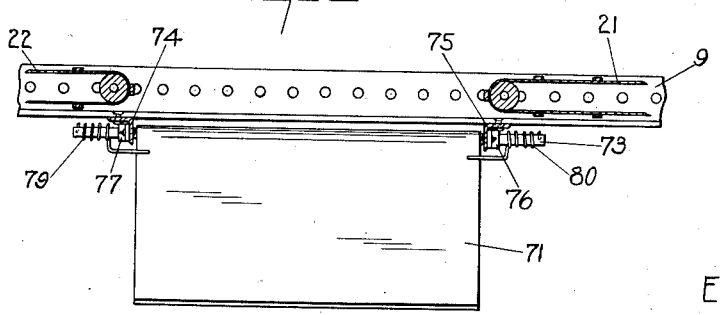
Inventor:
Ellert O. Hanson.
By W.C. Jirdinston
Attorney Patented July 31, 1934

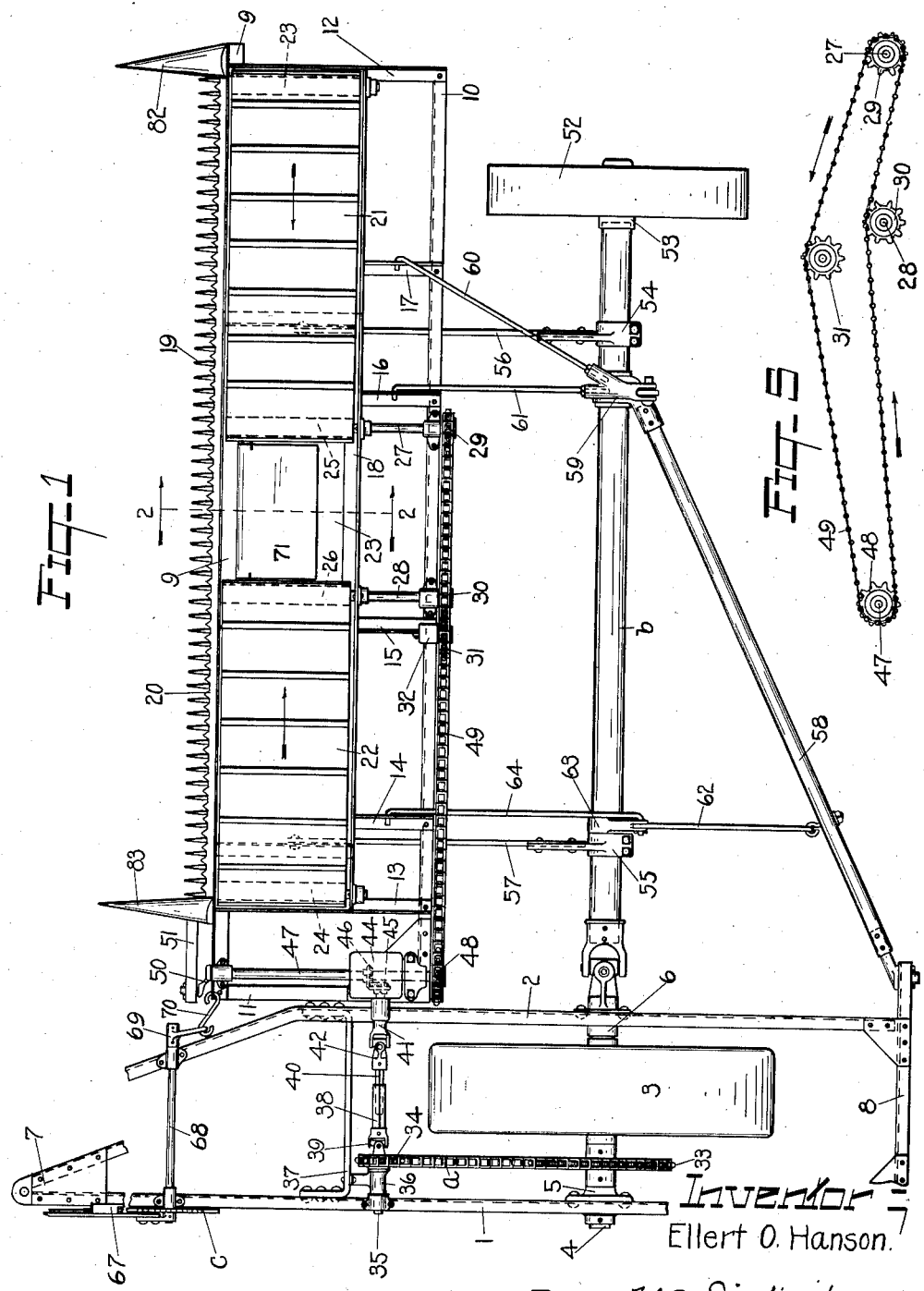

1,968,683

UNITED STATES PATENT OFFICE 1,968,683

REAPER

Ellert O. Hanson, Lajord, Saskatchewan, Canada, assignor to Deere & Company, Moline, Ill., a corporation of Illinois Application January 19, 1928, Serial No. 247,766

13 Claims. (Cl. 56—23)

My invention relates to harvesters and more particularly to reapers in the operation of which the grain is cut and laid in windrows from which it can be gathered, by suitable mechanism, direct to a thresher, or taken up and deposited in a wagon, by a rake and loader, and conveyed to a thresher, or to a place of storage for threshing when desired.

My invention has for its object an improvement located at the delivery part of the reaper and operative to automatically act upon the stubble and prepare it for better support of the cut grain deposited thereon. A further object of my invention is to provide means to act upon the stubble at the delivery point of the reaper so that the stubble will form a cushion for the grain deposited thereon and support it in such a manner that the air will circulate therethrough, and it will also be better protected from contact with the ground. Other objects will be disclosed in the following specification.

Referring to the drawings in which similar numerals indicate identical parts:

Figure 1 is a plan view of a reaper embodying my invention;

Figure 2 is an enlarged detail sectional view taken on the line 2—2 of Fig. 1 illustrating my device in operation;

Figure 3 is a section on the line 3—3 of Fig. 2, viewed from the rear and showing the mounting and operation of my device;

Figure 4 is an enlarged view of part of my device illustrating its support on the reaper frame, and Figure 5 illustrates the means by which power is transmitted to operate the conveyors.

Reapers of the central delivery type are well known in the art, and it is believed that the drawings herewith are sufficiently illustrative of such a machine and the application of my device thereto. The reaper frame, in this instance, includes side bars 1 and 2 spaced apart and between which the bull wheel 3 is mounted on a shaft 4 journaled in bearings 5 and 6 on the side bars 1 and 2 respectively. The bar 2 forwardly, for part of its length, extends to the forward end of the bar 1 and is joined thereto by a draft coupling 7 adapted to be attached to a tractor. A transverse bar 8 connects the rear ends of the bars 1 and 2 and extends in a grainward direction beyond the bar 2. The frame upon which the cutting and conveyor mechanism is mounted consists of front and rear angle bars 9 and 10, and side bars 11 and 12 connected at intervals by transverse bars 13, 14, 15, 16, 17. A bar 18, parallel with the bars 9 and 10, extends from the bar 12 to the bar 13 and is rigidly secured thereto. The cutting device shown is of the usual type, consisting of guard fingers 19 mounted on the frame bar 9, and a sickle bar 20.

Between the bars 9 and 18 are located the grain-receiving platform conveyors 21 and 22, separated a desirable distance at their inner ends to provide an open space 23 through which the cut grain drops upon the stubble. The platform conveyors are, preferably, of a type commonly used in grain harvesters and are made of canvas to which are attached slats for a more complete operation in moving the cut grain. The platform conveyors 21 and 22 are alike and travel respectively over idler rollers 23 and 24, journaled in suitable bearings on the bars 9 and 18, and over rollers 25 and 26 which are firmly mounted respectively on shafts 27 and 28 journaled in bearings on the bars 9, 18 and 10.

A sprocket 29 is secured on the rear end of the shaft 27, and a similar sprocket 30 is secured on the rear end of the shaft 28, and an idler sprocket 31 is mounted on a bracket 32 on the bar 10. On the bull wheel shaft 4 is secured a sprocket 33 over which a chain $a$ leads to a sprocket 34 on a shaft 35 journaled in a bearing on a bracket 36 bolted to the side bar 1 and to a crossbar 37 secured to the bars 1 and 2 by bolts or rivets. A sleeve-like part 38 is attached to the shaft by a universal joint 39, and slidably held therein is a shaft 40, rectangular in cross section and attached to a shaft 41 by a universal joint 42. The shaft 41 is journaled in a bearing 43, in a housing 44, and on its inner end is mounted a beveled gear 45, meshing with a beveled gear 46, said gears being shown in dotted lines.

The gear 46 is secured on a shaft 47 supported in a bearing in the housing 44, the shaft 47 extending rearwardly through the housing and supported in a bearing mounted on the frame, and having secured on the rear end thereof a sprocket 48 from which a chain 49 leads to and over the sprockets 29, 30 and 31. The forward end of the shaft 47 is journaled in a bearing on the front frame bar 9, and carries on its forward extremity a crank arm 50 connected to a pitman 51 attached to the cutter bar 20.

From the operative parts above described, it will be understood that power from the traction of the bull wheel 3 travels from the sprocket 33, through the chain $a$ to the shaft 35, and connected parts, imparting motion to the gears 45 and 46 to rotate the shaft 47, so that the cutting device is actuated, and at the same time the platform conveyors, through the rotation of the sprocket 48 and the chain 49, leading over the sprockets 29 and 30, travel toward the space 23 and drop therethrough, and onto the stubble, the cut grain. The machine is adjustable to vary the height of cut, in the following manner; a tubular shaft or axle b is connected, in alignment with the shaft 4, to the bearing 6 by a universal joint, and extending grainwardly is supported by a grain wheel 52, the latter being journaled on the lower end of a casting 53, which is vertically elongated to compensate for the difference in diameters of the bull and grain wheels, a construction old in the art and of common knowledge. Castings 54 and 55 are rigidly clamped on the tubular shaft b, and bolted thereto respectively are bars 56 and 57, which extend forwardly beneath the frame and are pivotally attached thereto in any suitable manner, as shown in dotted lines in Fig. 1. A diagonal brace 58 is connected to the grainward end of the bar 8 and to a casting 59, on the tubular bar b, from which brace rods 60 and 61 extend and are connected to the rear of the reaper frame. A brace rod 62 is connected to the diagonal brace 58 and to a casting 63 on the tubular bar b, and a similar rod 64 is attached to the casting and extends forwardly to connection with the reaper frame.

The height at which it is desired to cut the grain is regulated by raising or lowering the reaper frame, upon which are mounted the cutting device and the platform conveyors, and this adjustment is accomplished by operation of a lever 67 secured on a shaft 68 rockably supported on the bars 1 and 2, and carrying a crank 69 on its grainward end to which is hooked a link 70 connected to the bar 9. It can be readily understood that actuation of the lever 67 will rock the shaft 68 and raise or lower the cutting and conveying mechanism through the link connection of the bar 9 to the crank 69, the reaper frame and connected parts pivoting on the tubular bar b, the lever 67 having the usual type of dog to engage with a segmental rack c on the bar 1.

My invention is located in the space 23 and comprises a flexible and preferably metallic plate 71 having its upper end bent to form a tube 72 through which loosely extends a shaft 73, located transversely of the open space 23 and rearwardly of the cutter bar and below the platform conveyors. The shaft 73 is supported on bars 74 and 75, secured respectively on opposite sides of the space 23 to the frame bars 9 and 18. The shaft 73 passes through suitable openings in the bars 74 and 75 and through castings 76 and 77, rigidly bolted to said bars, and is held against rotation by pins 78, which are inserted in suitable holes in the castings and the shaft. Pressure is exerted on the plate 71 by springs 79 and 80, coiled respectively on the end portions of the shaft 73, with their outer ends bent to be held in sockets 81 in the shaft 73, and their inner ends bent in parallelism to the shaft 73 and bearing upon the face of the plate 71.

The standing grain is gathered between dividers 82 and 83 mounted respectively on opposite ends of the cutting mechanism of the reaper and operated upon by a reel 84 to bend the stalks as they approach the knife and to cause them to fall in an orderly manner on the conveyors 21 and 22, which, operating toward each other, carry the grain in a continuous stream to the space 23 through which it falls partly upon the stubble and partly upon the plate 71, which withdraws from under the fallen grain as the machine advances, leaving it on the stubble in the form of a windrow. The action of the springs 79 and 80, on the plate 71, and the spring of the plate itself, bends the stubble, as shown at d in Fig. 2, and forms a cushion, as shown at e in Figure 2, upon which the falling grain is loosely deposited in a manner to support it from contact with the ground, and in a condition permitting a circulation of air to accelerate curing, the pressure of the plate 71 being constant irrespective of the vertical adjustment of the reaper. The central delivery reaper is described merely as illustrative of one type of machine to which my invention is adapted and I make no claim to that particular type of reaper as my improvements may also be applied to reapers of other types. Furthermore, I do not limit myself to the construction of my device as shown and described except in so far as such construction is particularly claimed, as it is evident variation thereof may be made without affecting the scope of my invention.

What I claim is—

1. In a central delivery reaper; the combination of a cutting mechanism; a means to receive and convey cut grain toward the center of the reaper, said means spaced apart to provide an opening through which the cut grain passes to form a windrow; a plate pivotally supported on the reaper and positioned rearward of the cutting mechanism and below the plane of the receiving and conveying means; and springs operating to press said plate downwardly on the stubble to form a cushion to support the windrow.

2. A harvesting machine comprising means for cutting the grain, means for bending over stubble to form a cushion, and means separate from said cushion forming means for depositing cut grain directly upon the bent over stubble back of said stubble bending means to form a windrow.

3. A harvesting machine comprising means for cutting the grain, means for bending over stubble to form a cushion and delivering cut grain upon said cushion in the form of a windrow, and means for depositing part of the cut grain directly upon the bent over stubble back of said stubble bending means.

4. A harvesting machine comprising means for cutting the grain, means for bending over stubble to form a cushion and delivering cut grain upon said cushion in the form of a windrow, and a spring for applying downward pressure to said stubble bending means.

5. A harvesting machine comprising means for cutting the grain, a rearwardly and downwardly extending plate adapted to engage and bend over stubble to form a windrow supporting cushion, and to deliver cut grain upon said cushion in the form of a windrow, and a spring for applying downward pressure to said plate.

6. A harvesting machine comprising means for cutting the grain, a rearwardly and downwardly extending plate adapted to engage and bend over stubble to form a windrow supporting cushion, and to deliver cut grain upon said cushion in the form of a windrow, and means disposed above said plate for depositing part of the cut grain directly upon the bent over stubble back of said plate.

7. A harvesting machine comprising means for cutting the grain, and a rearwardly and downwardly extending plate having a transversely disposed convex forward surface adapted to engage and bend over stubble to form a windrow supporting cushion and to deliver cut grain in the form of a windrow upon the bent over stubble.

8. A harvesting machine comprising means for cutting the grain, a rearwardly and downwardly extending plate having a transversely disposed convex forward surface adapted to engage and bend over stubble to form a windrow supporting cushion, and means for depositing cut grain in the form of a windrow directly upon the bent over stubble.

9. A harvesting machine comprising means for cutting the grain, a rearwardly and downwardly extending plate having a transversely disposed convex forward surface adapted to engage and bend over stubble to form a windrow supporting cushion and to deliver cut grain in the form of a windrow upon the bent over stubble, and spring means for exerting downward pressure upon said plate.

10. A harvesting machine comprising means for cutting the grain, means operable to adjust said cutting means to vary the height of cut, a pivotally mounted rearwardly and downwardly extending plate adapted to engage and bend over stubble to form a windrow supporting cushion and to deliver cut grain upon said cushion in the form of a windrow, said plate having a convex forward surface, and spring means for applying downward pressure to said plate.

11. In a reaper, the combination of a cutting mechanism, a means to receive and convey cut grain laterally and deposit it in the form of a windrow, a plate pivotally supported on the reaper and positioned rearwardly of the cutting mechanism and below the plane of the receiving and conveying means, and a spring operating to press said plate downwardly on the stubble to form a cushion to support the windrow.

12. A harvesting machine comprising means for cutting grain, means for bending over stubble to form a cushion, and means for depositing cut grain on said cushion, said stubble bending means terminating substantially forwardly of the rear portion of said depositing means, whereby portions of the grain are deposited directly upon the bent over stubble.

13. A harvesting machine comprising means for cutting the grain, means for bending over the stubble to form a cushion, and means for conveying the cut grain toward said cushion, said stubble bending means extending rearwardly to approximately the central portion of the conveying means, whereby a portion of the cut grain is deposited directly onto the bent over stubble back of said stubble bending means.

ELLERT O. HANSON.